March 20, 1962     B. LEIBINGER     3,025,600
NIBBLING MACHINE

Filed Nov. 19, 1958     2 Sheets-Sheet 1

INVENTOR.
Berthold Leibinger
BY Michael S. Striker
Attorney

United States Patent Office 3,025,600
Patented Mar. 20, 1962

3,025,600
NIBBLING MACHINE
Berthold Leibinger, Stuttgart-Weil im Dorf, Germany, assignor to Messrs. Trumpf & Co., Stuttgart-Weil im Dorf, Germany
Filed Nov. 19, 1958, Ser. No. 774,925
Claims priority, application Germany July 18, 1958
6 Claims. (Cl. 30—241)

The present invention relates to punches.

More particularly, the present invention relates to hand punches adapted to be carried by the operator and capable of operating on a work sheet so that the reciprocating punch and a die which cooperates therewith serve to cut from the work sheet a slot extending along a path determined by the movement of the hand tool and work sheet with respect to each other.

A conventional hand tool of this type includes a substantially U-shaped support which has one leg fixed to the housing of the tool and an opposite leg which carries at its free end a die carrier so that the latter may support the die coaxially with the punch beneath the latter to cooperate therewith. This U-shaped support presents several disadvantages. It is located just behind the punch in the path of movement of the latter and cannot be any wider than the punch so that it will be capable of moving along a slot formed by the punch. As a result, it is necessary to make the U-shaped support member of considerable breadth so that it will have the necessary stiffness. Moreover, this U-shaped support member makes it impossible to move the punch and work sheet with respect to each other along a sharp curve of small radius because the radius of curvature of the slot cut by the punch must be large enough to accommodate the U-shaped support member. Furthermore, when it is desired to cut along a path which is located in its entirety within the outer periphery of the work sheet, it is necessary first to cut a hole in the work sheet so that the punch and die can be introduced into this hole before the cutting starts. Because of the U-shaped support member for the die carrier such a hole must necessarily have a relatively large dimension.

One of the objects of the present invention is to provide a hand punch of the above type which does not have any support member of the above type for the die carrier and which is capable of moving in any desired direction with respect to a work sheet along any radius no matter how small.

Another object of the present invention is to provide a hand tool of the above type which can be used to cut along a path completely located within the outer periphery of the work sheet after cutting in the work sheet a hole which is only large enough to pass through the work sheet the punch itself.

A further object of the present invention is to provide a hand tool of the above type with a support for a die or stripper member which will be stressed substantially entirely in tension so that the support need not overcome any substantial bending moments and thus can be of an extremely small size rendering the hand tool exceedingly compact and light.

An additional object of the present invention is to provide a hand punch wherein the support for a die or stripper carrier located beneath the work sheet functions additonally to limit the amount of material cut from the work sheet at each stroke of the punch.

With the above objects in view the present invention includes in a hand punch a reciprocable punch carrier means and a die carrier coaxial therewith. The punch carrier means is adapted to carry a punch which cooperates with a die carried by the die carrier. The punch carrier means and die carrier have a common axis, and the die carrier is carried by a support means which in accordance with the present invention extends along the common axis of the punch carrier means and die carrier.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary sectional elevational view of another embodiment of a hand tool according to the present invention.

Figure 1:
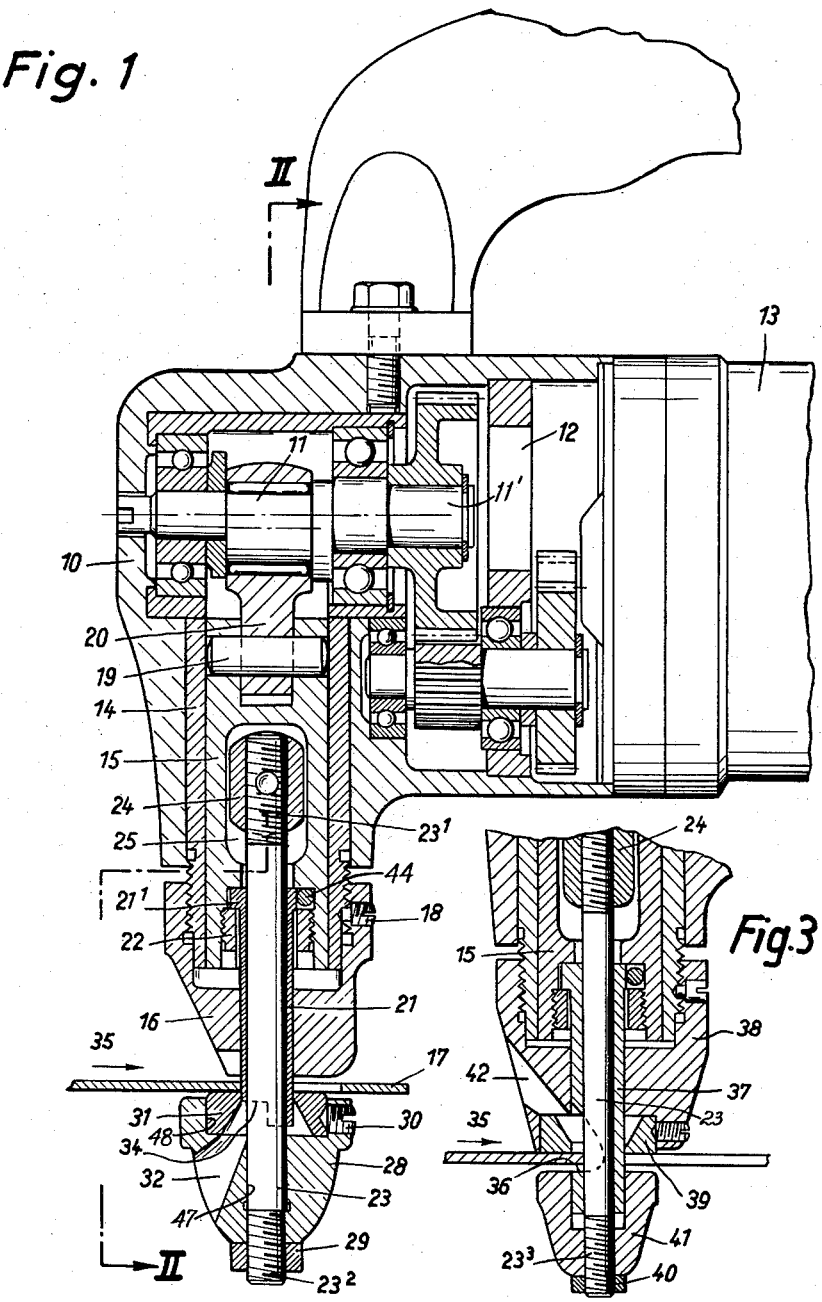
FIG. 1 is a sectional elevational view of a tool according to the present invention taken along line I—I of FIG. 2 in the direction of the arrows.
Figure 2:
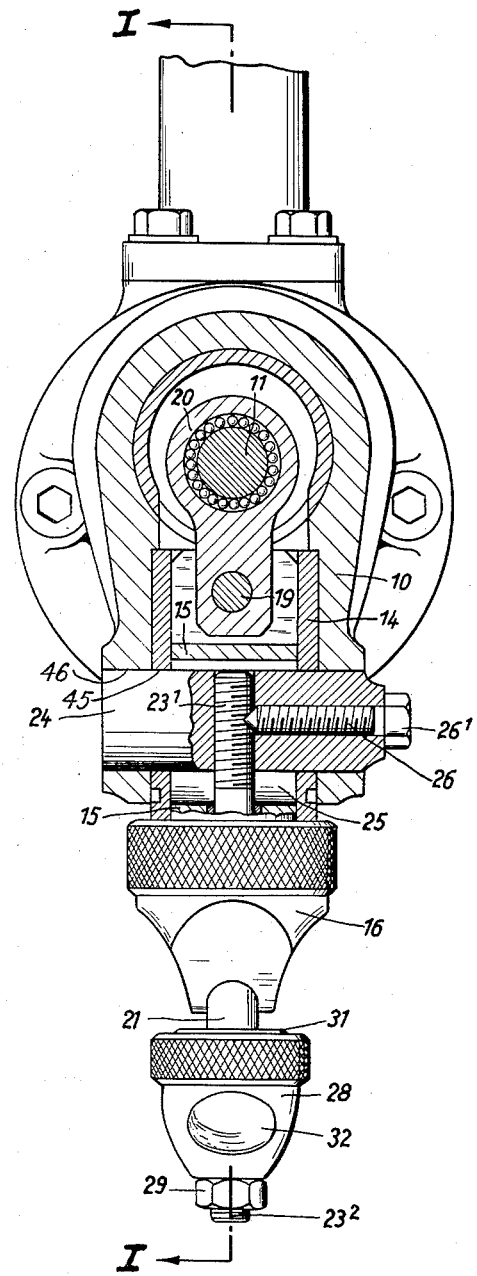
FIG. 2 is a sectional elevational view taken along line II—II of FIG. 1 in the direction of the arrows.

Referring now to FIGS. 1 and 2, there is shown therein a front housing portion 10 of the hand tool, this housing portion 10 being provided with a handle shown at the upper parts of FIGS. 1 and 2. A shaft 11' having an eccentric portion 11 is supported for rotation about its axis in the housing 10, and a motor 13 drives the shaft through a suitable gear reduction unit 12. The housing 10 carries a guide sleeve 14, and this sleeve 14 together with the housing 10 form a tubular guide means for supporting a reciprocable punch carrier means 15 located within the sleeve 14. In the embodiment of FIGS. 1 and 2, the lower end of the sleeve 14 of the tubular guide means is provided with threads which cooperate with inner threads of a stripper member 16 so that the latter is carried by the sleeve 14, this stripper member 16 serving to strip the work sheet 17 from the reciprocating punch during the upward movement of the latter. A set screw 18 passes threadedly through a wall of the stripper member 16 and engages a portion of the sleeve 14 to prevent turning of the stripper member 16.

As is apparent from FIGS. 1 and 2, the upper end portion of the reciprocable punch carrier means 15 is transversely slotted and carries a pin 19 extending through this slot. A connecting rod 20 surrounds the eccentric portion 11 of the drive shaft and has a portion extending into the upper slot of the punch carrier 15, the pivot pin 19 extending through the connecting rod 20 so that in this way the drive is transmitted from the rotary drive shaft to the punch carrier means 15 for axially reciprocating the latter in the tubular guide means 10, 14.

The punch carrier 15 is formed at a lower portion thereof with an axial bore which receives an axially bored punch 21 fixedly carried by the punch carrier 15 to be reciprocated by the latter. The upper end of the punch 21 has an outwardly directed annular flange 21', and a ring 22 has outer threads cooperating with inner threads at the axially bored lower portion of the carrier 15 to fixedly hold a bored punch 21 in the carrier 15 for reciprocating movement therewith. As may be seen at the upper right portion of the punch 21 of FIG. 1, a pin 44 extends through the carrier 15 and in the bore thereof which receives the punch and engages a flat surface of the annular flange 21' to prevent turning movement of the punch 21 with respect to the punch carrier 15.

In accordance with the present invention an elongated rod 23 extends through and beyond the punch 21, this rod 23 having an upper threaded portion 23' threadedly connected with a transverse bar 24 in a threaded opening of the latter which is coaxial with the tubular guide means 10, 14. The rod 23 has a free end portion distant from the bar 24 and provided with threads $23^2$.

The punch carrier means 15 is formed with a slot 25 passing transversely therethrough and extending along the axis of the sleeve 14. The axial length of the slot 25 is sufficient to provide the desired axial stroke of the carrier 15 together with the punch 21 without causing the carrier 15 to strike against the bar 24. This bar 24 passes transversely through the slot 25 and through a pair of aligned bores 45 of the sleeve 14 into an additional pair of aligned bores 46 of the housing 10, as is evident from FIG. 2. The bar 24 is cylindrical except for a pair of opposed flat parallel face portions located in planes, respectively, parallel to the axis of the rod 23, as indicated in FIG. 1.

As may be seen from FIG. 2, the right portion of the bar 24, as viewed in FIG. 2, is formed with a threaded axial bore which receives a screw 26 having a head end 26'. By turning the screw 26 the operator can place the left end of the latter, as viewed in FIG. 2, in engagement with the upper end 23' of the rod 23 to releasably fix the latter to the bar 24 and prevent turning of the rod 23 about its axis.

The lower free end portion of the rod 23, as viewed in FIGS. 1 and 2, carries a die carrier 28. The die carrier 28 is formed with an axial bore through which the rod 23 passes, and a nut 29 engages the thread $23^2$ to hold the die carrier 28 in the position illustrated in FIGS. 1 and 2. This die carrier 28 is formed in addition to the bore 47 which receives the rod 23 with an upper recess 48 which receives the circular die 31 and with a second bore 32 communicating with the die-receiving recess 48 and with the rod-receiving bore 47, so that chips may fall through the bore 32 which is located to one side of the bore 47 which receives the rod 23. A set screw 30 is carried by the die carrier 28 and cooperates with the die 31 to prevent rotation of the latter. Because the die 31 is circular it can be turned from time to time as portions of its cutting edge become worn. During movement of the work sheet 17 in the direction of arrow 35 of FIG. 1 with respect to the hand tool, the cutting end 34 of the punch 21 cuts from the work sheet a sickle-shaped chip at each stroke of the punch, and it will be noted that the rod 23 limits the amount of material which can be cut at each stroke.

The nut 29 together with the thread $23^2$ serve as a means for determining the axial position of the die carrier 28, while the threads of the sleeve 14 and stripper 16 which connect these elements together serve as a means for axially adjusting the stripper 16, so that the elements 16 and 28 are capable of being axially adjusted independently of each other. It will be noted that the members 16 and 28 are respectively located on opposite sides of the plane in which the work sheet 17 is located.

When it is desired to use above-described machine to cut along a path which is located in its entirety within the outer periphery of the work sheet 17, the nut 29 is removed and the die carrier 28 is removed from the rod 23. Then a hole is made in the work sheet 17, and this hole need only be large enough so that the punch 21 can pass therethrough. The machine without the die carrier 28 and nut 29 is placed over the work sheet and the rod 23 together with the punch are passed through this hole, and then the die carrier 28 is re-assembled with the rod 23 by connecting the nut 29 thereto. Now the cutting can be carried out in the usual way, the rod 23 acting as a stop to limit the amount of material cut during each stroke of the punch 21.

If desired, the die carrier 28 can be permanently fixed with the rod 23, and the latter can be unthreaded from the bar 24 to be separated therefrom and then reassembled therewith by passing the rod 23 through the punch 21 after the latter has been passed through an opening formed in the work sheet 17.

Because it is possible to independently adjust the stripper 16 and the die carrier 28 axially with respect to each other, the position of each of these members 16 and 28 with respect to the work sheet can be easily adjusted.

FIG. 3 illustrates an embodiment of the invention where the punch cuts on its up-stroke rather than on its down-stroke. Thus, it will be seen that the axially bored punch 37 is provided adjacent to but spaced upwardly from its bottom end with a notch which forms at the lower part of the notch the cutting edge 36 which cuts during the up-stroke of the punch 37. In this embodiment the die carrier 38 which carries the die 39 is carried by the sleeve 14 of the tubular guide 10, 14 instead of the stripper 16, and the die carrier 38 is provided with a lateral bore 42 through which the chips pass. The lower threaded end portion $23^3$ of rod 23 extends through the stripper 41 which is supported by the nut 40 threadedly carried by the bottom end of the rod 23.

It will be noted that in this embodiment of the invention as well as in the embodiment of FIGS. 1 and 2 substantially all of the stress on the rod 23 is in tension and there is very little bending stress.

It will be noted that in the embodiment of FIGS. 1 and 2, the rod 23 serves the additional purpose of maintaining the die 31 at all times properly aligned with the punch. In this way it is possible to obtain a very high quality cut while subjecting the punch to very little wear so that the length of time that the punch can be used before it must be sharpened or replaced by a different punch is extremely great. Furthermore, the radius of curvature which can be negotiated with the tool of the invention is without limit, since there are no supports located beyond the structure associated with the punch to limit the extent to which the tool can be turned.

It will be understood that each of the elements described above, or two or more together, may also find a useful application in other types of punches differing from the types described above.

While the invention has been illustrated and described as embodied in hand punches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a nibbling machine, in combination, a housing; reciprocable punch carrier means adapted to carry an axially bored punch carried by said punch carrier means for reciprocating therewith along its axis; a die carrier member and a stripper member respectively located on opposite sides of a plane normal to said axis in which the work sheet is adapted to be located, one of said members being located on the same side of said plane as said punch carrier means; guide means connected to said housing and guiding said punch carrier means for reciprocating movement along said axis; and a rod fixedly carried by said housing and extending along said axis through said plane, said rod extending through said axially bored punch and carrying at a portion of said rod which is located on the other side of said plane from said punch carrier means the other of said members.

2. In a nibbling machine, in combination, a housing; tubular guide means connected to said housing and having a longitudinal axis; elongated punch carrier means axially slidable within said tubular guide means; an axially bored punch coaxially with said tubular guide means and carried by said punch carrier means for reciprocating therewith along the axis of said guide means, said punch carrier means being formed with a slot extending axially therealong and transversely therethrough; a bar extending through said slot transversely of the axis of said tubular guide means and fixedly carried by said housing; a stripper member and a die carrier member respectively located on opposite sides of a plane normal to said axis in which the work sheet is adapted to be located, one of said members being carried by said guide means on the same side of said plane as said punch carrier means; and a rod extending through said axially bored punch along the axis thereof and fixed at one end to said bar, said rod extending through and beyond said plane and having a free end portion distant from said bar on the side of said plane opposite from said punch carrier means; and means fixing the other of said members to said free end portion of said rod on said opposite side of said plane.

3. In a nibbling machine, in combination, a housing; tubular guide means connected to said housing and extending along a longitudinal predetermined axis; reciprocable punch carrier means slidable in said guide means for reciprocating movement along said axis; an axially bored punch carried by said punch carrier means for movement along said axis, said reciprocable punch carrier means being formed with a slot passing transversely therethrough and extending along said axis; a bar extending through said slot transversely of said guide means and fixedly carried by said housing; a rod fixed to said bar and extending along the axis of said guide means, said rod extending through and beyond said axially bored punch carried by said punch carrier means, and said rod having a free end portion distant from said bar; a stripper member and a die carrier member respectively located on opposite sides of a plane normal to the axis of said guide means in which the work sheet is adapted to be located; means connecting one of said members to said guide means for adjustable movement along the axis thereof; and means connecting the other of said members to said free end portion of said rod for adjustable movement along the axis of the latter, so that each of said members is axially adjustable independently of the other.

4. In a nibbling machine, in combination, a housing; tubular guide means connected to said housing and having a longitudinal axis; reciprocable punch carrier means axially slidable in said guide means; an axially bored punch carried by said punch carrier means for reciprocating therewith along the axis of said guide means, said punch having a cutting face extending substantially about half of the periphery thereof, said punch carrier means being formed with a slot passing transversely therethrough and extending along said axis; a bar extending through said slot transversely of said guide means and fixedly carried by said housing; an elongated rod removably connected to said bar and extending therefrom along the axis of said guide means beyond the latter, said rod passing through said axially bored punch carried by said punch carrier means; and a stripper member and a die carrier member respectively located on opposite sides of a plane normal to the axis of said guide means in which a work sheet is adapted to be located, one of said members being carried by said guide means on the same side of said plane as said punch carrier means and the other of said members being fixed to a free end portion of said rod located on the side of said plane opposite from said punch carrier means, so that said other member and rod are removably connected to said bar.

5. In a nibbling machine, in combination, a housing; reciprocable punch carrier means reciprocable in said housing along a longitudinal axis, an axially bored punch carried by said punch carrier means for reciprocation along said axis; die carrier means coaxial with said punch carrier means, said die carrier means being formed with a first bore passing therethrough along the axis of said punch carrier means, with a recess for receiving a die, and with a second bore communicating with said first bore and recess and located to one side of said first bore so that chips may pass through said second bore; and support means fixed to said housing extending along the axis of said punch carrier means through and beyond said axially bored punch and supporting said die carrier means.

6. In a nibbling machine, in combination, a housing; punch carrier means reciprocable in said housing along an axis; a die carrier member and a stripper member respectively located on opposite sides of a plane normal to said axis in which a work sheet is adapted to be located, one of said members being located on the same side of said plane as said punch carrier means and at least one member being formed with a bore extending along said axis; a rod fixedly carried by said housing and extending along said axis through said axial bore and carrying at a portion of said rod which is located on the other side of said plane from said punch carrier means the other of said members; and a punch at least partly surrounding said rod in engagement therewith and carried by said punch carrier means for reciprocation along said axis.

References Cited in the file of this patent

UNITED STATES PATENTS

| | | |
|---|---|---|
| 256,960 | Blake | Apr. 25, 1882 |
| 2,278,311 | Gray | Mar. 31, 1942 |
| 2,376,590 | Forss | May 22, 1945 |
| 2,567,095 | Benjamin | Sept. 4, 1951 |
| 2,633,197 | Nischan | Mar. 31, 1953 |
| 2,770,037 | Bjorklund | Nov. 13, 1956 |
| 2,844,872 | Yermish | July 29, 1958 |